(12) United States Patent
Cranfill et al.

(10) Patent No.: US 9,804,740 B2
(45) Date of Patent: Oct. 31, 2017

(54) GENERATING CONTEXT-BASED OPTIONS FOR RESPONDING TO A NOTIFICATION

(75) Inventors: Elizabeth F. Cranfill, San Francisco, CA (US); Alessandro F. Sabatelli, San Francisco, CA (US); Donald W. Pitschel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 13/489,547

(22) Filed: Jun. 6, 2012

(65) Prior Publication Data
US 2013/0328665 A1    Dec. 12, 2013

(51) Int. Cl.
| | |
|---|---|
| G06F 3/048 | (2013.01) |
| G06Q 10/10 | (2012.01) |
| G06F 3/0482 | (2013.01) |
| G06F 9/54 | (2006.01) |
| H04M 1/725 | (2006.01) |

(52) U.S. Cl.
CPC ............ G06F 3/0482 (2013.01); G06F 9/542 (2013.01); G06Q 10/109 (2013.01); H04M 1/72572 (2013.01)

(58) Field of Classification Search
CPC .................................................. G06Q 10/109
USPC ......................................... 705/7.18; 715/811
See application file for complete search history.

(56) References Cited

U.S. PATENT DOCUMENTS

| | | | | |
|---|---|---|---|---|
| 5,420,975 A | * | 5/1995 | Blades ................. | G06F 3/0482 715/811 |
| 7,653,191 B1 | * | 1/2010 | Glasser ............ | H04M 3/42229 379/201.1 |
| 8,583,784 B2 | * | 11/2013 | Beebe et al. .................. | 709/224 |
| 2003/0225730 A1 | * | 12/2003 | Warner ................. | H04M 3/493 |
| 2004/0100505 A1 | * | 5/2004 | Cazier .................. | G06F 3/0482 715/811 |
| 2007/0083827 A1 | * | 4/2007 | Scott ..................... | G06F 9/4443 715/811 |
| 2007/0229517 A1 | * | 10/2007 | May et al. ..................... | 345/501 |
| 2008/0082651 A1 | * | 4/2008 | Singh et al. .................. | 709/224 |
| 2008/0195312 A1 | | 8/2008 | Aaron | |
| 2010/0312838 A1 | * | 12/2010 | Lyon et al. .................... | 709/206 |

(Continued)

FOREIGN PATENT DOCUMENTS

| | | |
|---|---|---|
| CN | 201054130 Y | 4/2008 |
| EP | 2413578 A1 | 2/2012 |

(Continued)

OTHER PUBLICATIONS

Dey, A.; Abowd, G., "CybreMinder: A Context-Aware System for Supporting Reminders" (Sep. 25-27, 2000), Proceedings of the Second International Symposium on Handheld and Ubiquitous Computing, pp. 172-186 [retrieved from http://link.springer.com/content/pdf/10.1007%2F3-540-39959-3_13.pdf].*

(Continued)

*Primary Examiner* — Brian W Wathen
(74) *Attorney, Agent, or Firm* — Blank Rome LLP (57) ABSTRACT

A user of a programmable device has a context that may be evaluated and compared to a context of a notification generated by the operating system or an application running on the programmable device. The comparison may be used to generate one or more optional responses to the notification that may allow additional functionality beyond dismissing the notification or opening a corresponding event entry.

28 Claims, 4 Drawing Sheets

(56) References Cited

U.S. PATENT DOCUMENTS

| | | | | |
|---|---|---|---|---|
| 2011/0009107 | A1* | 1/2011 | Guba | G08G 1/20 455/418 |
| 2011/0119628 | A1* | 5/2011 | Carter et al. | 715/812 |
| 2011/0130958 | A1* | 6/2011 | Stahl | G01C 21/362 701/533 |
| 2011/0137960 | A1 | 6/2011 | Price | |
| 2011/0148632 | A1* | 6/2011 | Chin | G06Q 10/109 340/540 |
| 2011/0296346 | A1* | 12/2011 | Chen et al. | 715/811 |
| 2012/0006611 | A1* | 1/2012 | Wallace | H04M 1/67 180/272 |

FOREIGN PATENT DOCUMENTS

| | | | |
|---|---|---|---|
| JP | 2002108829 | A | 4/2002 |
| JP | 2003308420 | A | 10/2003 |
| JP | 2012503822 | A | 2/2012 |
| WO | 2010036477 | A2 | 4/2010 |
| WO | 2012045073 | A2 | 4/2012 |

OTHER PUBLICATIONS

Murphy, M., "Beginning Android 3" (Jul. 13, 2011), Apress, pp. 423-433 [retrieved from http://techbus.safaribooksonline.com/book/programming/android/9781430232971].*

Beskow, J.; Edlund, J.; Granstrom, B.; Gustafson, J.; Skantze, G.; Tobiasson, H., "The MonAMI Reminder: a spoken dialogue system for face-to-face interaction" (Sep. 2009), 10$^{th}$ Annual Conference of the International Speech Communication Association, pp. 296-299 [retrieved from http://www.isca-speech.org/archive/interspeech_2009/i09_0296.html].*

Grudin, J., "The Case Against User Interface Consistency" (Oct. 1989), Communications of the ACM, vol. 32, Issue 10, pp. 1164-1173 [retrieved from http://dl.acm.org/citation.cfm?id=67934].*

Asch, J., "iOS 5; Notifications and Notification Center" (Oct. 12, 2011), pp. 1-9 [retrieved from http://gigaom.com/2011/10/12/ios-5-notifications-and-notification-cented/].*

Egger, F. "Android App: Calendar Event Reminder" (May 17, 2011), pp. 1-25 [retrieved from http://web.archive.org/web/20110517082708/http://blog.invalidobject.com/android-app-calendar-event-reminder].*

Benjamin, J. "RemindMeLater Puts the Snooze on your iPhone Calendar Events" (Oct. 22, 2010), pp. 1-4 [retrieved from http://www.idownloadblog.com/2010/10/22/remindmelater-puts-the-snooze-on-your-iphone-calendar-events/].*

Kumar, S.; Qadeer, M.A.; Gupta, A., "Location Based Services Using Android (LBSOID)" (Dec. 11, 2009), 2009 IEEE International Conference on Internet Multimedia Services Architecture and Applications (IMSAA), pp. 1-5 [retrieved from http://ieeexplore.ieee.org/stamp/stamp.jsp?tp=&arnumber=5439442].*

Manglani, D., "Design and development of an interactive events app providing event reminders based on user location" (Jun. 5, 2012), pp. 1-79 [retrieved from http://scholarworks.csun.edu/bitstream/handle/10211.2/1206/myfinalpaperMay2012.pdf?sequence=1].*

Fukazawa et al., "Automatic Mobile Menu Customization Based on User Operation History" (2009), Proceedings of the 11th International Conference on Human-Computer Interaction with Mobile Devices and Services, Article No. 50, pp. 1-4 [retrieved from http://dl.acm.org/citation.cfm?id=1613921].*

Extended European Search Report received in EP Application No. 13170605.3, dated Sep. 3, 2013.

"This summer, fusion of OS X and iOS will further accelerate!," Roaring of Mountain Lion, Mac People vol. 18 No. 6, Japan, ASCII Media Works Inc., Feb. 29, 2011, vol. 18, p. 22.

F. Ikeda, "avoid data duplication or loss for perfect utilization!!," iCloud walk-through, Mac People vol. 18 No. 1, Japan, ASCII Media Works Inc., Nov. 29, 2011, vol. 18, p. 67.

Greatness of location information function of OmniFunction notifying "Stabucks is nearby. Shouldn't you stop at?," [online], [searched on Oct. 27, 2014], Internet, Oct. 17, 2011.

T. Numata, "iOS5 Programming Answer Book," 1st Edition, Published on Jan. 1, 2012, Syuwa System Co., Ltd., p. 4-7.

"Special Supplement of MacPeople Mar. 2012 issue, MacPeople Basic Address Book/iCal," Published on Jan. 28, 2012, ASCII Media Works Inc., p. 40-47.

* cited by examiner

GENERATING CONTEXT-BASED OPTIONS FOR RESPONDING TO A NOTIFICATION

BACKGROUND

This disclosure relates generally to the field of computer programming. More particularly, but not by way of limitation, it relates to techniques for providing additional responses to a calendar reminder.

Current calendaring systems offer reminders that may be displayed associated with an entry on a calendar associated with a person. These reminders are typically displayed some amount of time prior to the actual event time, giving the person the ability to take actions that may be necessary or desirable prior to the scheduled time of the calendar entry. For example, when a calendar entry relates to an event at a different location than the person, a reminder may be set to display to allow the person sufficient time to travel to the event location.

When the reminder is displayed, in some calendar systems the user of the device displaying the reminder may dismiss the reminder or open the corresponding calendar entry to view more information about the event. By opening the calendar entry, the user may modify the event, as desired, including modifying the pre-event reminder settings. In some calendar systems, the reminder may also allow the user to reset the reminder to a different time, generally referred to as "snoozing" by analogy to what is generally known as a "snooze button" on common alarm clocks. Allowing additional options would be useful.

SUMMARY

A user of a programmable device has a context that may be evaluated and compared to a context of a notification generated by the operating system or an application running on the programmable device. The comparison may be used to generate one or more optional responses to the notification that may allow additional functionality beyond dismissing the notification or opening a corresponding event entry.

A method is disclosed. The method includes receiving a notification from a notification service of an operating system of a programmable device; evaluating a first context of the notification; evaluating a second context of a user of the programmable device; and offering to the user a first optional response to the notification based, at least in part, on the first context and the second context.

A programmable device is disclosed. The programmable device includes a programmable control device; a memory, coupled to the programmable control device; and an operating system stored in the memory. The operating system includes logic to generate notifications to a user of the programmable device; and logic to offer an optional response to a notification, based at least in part on a context of the notification and a context of the user.

A non-transitory machine readable storage medium is disclosed. Instructions are stored on the medium that when executed by a programmable device, cause the programmable device to: generate a notification to a user of the programmable device of an event; compare a context of the notification with a context of the user; offer an optional response to the notification responsive to the comparison of the context of the notification with the context of the user; receive a selection of the optional response; and perform an action corresponding to the optional response.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

In the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of notification systems having the benefit of this disclosure.

The following description is written in terms of notifications generated as a result of calendar entries. However, the techniques and systems described below are not limited to use with notifications associated with calendar entries, but may be used with other types of event-based notifications, including notifications associated with tasks or to-do lists, invitations, etc.

Figure 1:
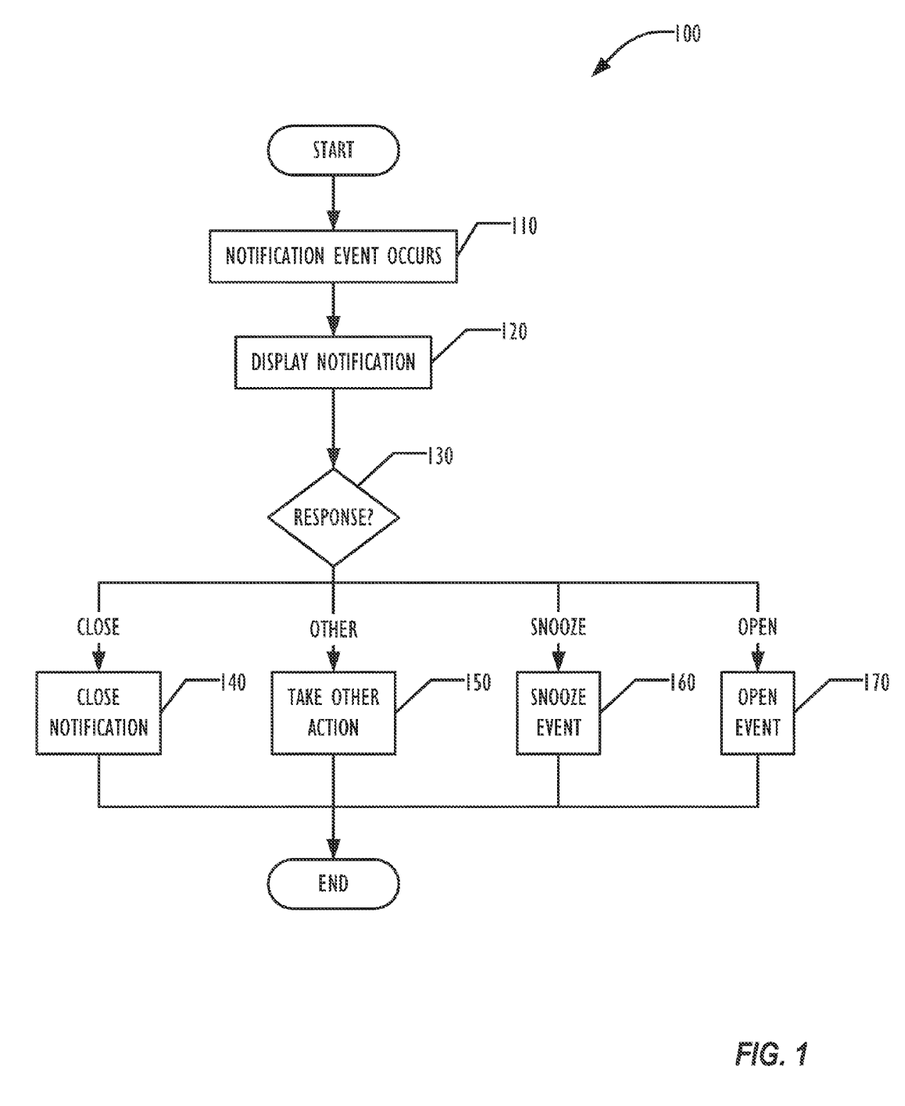
FIG. 1 is a flowchart that illustrates a technique for offering a user an optional response to a notification based on contextual information.

FIG. 1 is a flowchart illustrating a technique 100 for offering a user an optional response to a notification based on contextual information. In block 110, a notification event occurs, causing the generation of a notification by a notification service of an operating system of a programmable device. The notification service provides a standard interface for causing notifications to be generated by applications. Upon receiving the notification, in block 120 the notification is displayed to the user. In addition to the conventional options to allow the user to close and ignore the notification or to view the associated event, other affordance options may be provided to the user. As illustrated in FIG. 1, a Snooze option may be provided, as well as an Other option.

In some implementations, the Snooze option may be subsidiary to the Other option as one of the optional responses provided to the user upon selecting the Other option.

In block 130, if the user responds to the notification by selecting one of the presented options, an action corresponding to that option may be performed, illustrated in FIG. 1 as closing the notification (140), snoozing the event (160), opening the event (170), and taking an Other action (150). If the Other action is taken in block 150, a secondary user interface element may be displayed offering the user additional choices for actions that may be taken. The user may select (and thus perform) one of the Other actions from the secondary user interface element.

Various implementations may automatically hide notifications after a predetermined time, removing the notification from the display. Other implementations may leave the notifications visible indefinitely, waiting for a user response.

Some implementations may provide for identifying one of the possible responses to the notification as a default action.

The Other optional responses to the notification made available after the user selects the Other option may not be predetermined, but may be dynamically generated or selected from a list of possible optional responses. A configuration setting may allow the user to select from or limit the list of possible optional responses. Preferably, the optional responses to offer to the user are contextually determined based, at least in part, on a context associated with the user and a context associated with the notification.

Figure 2:
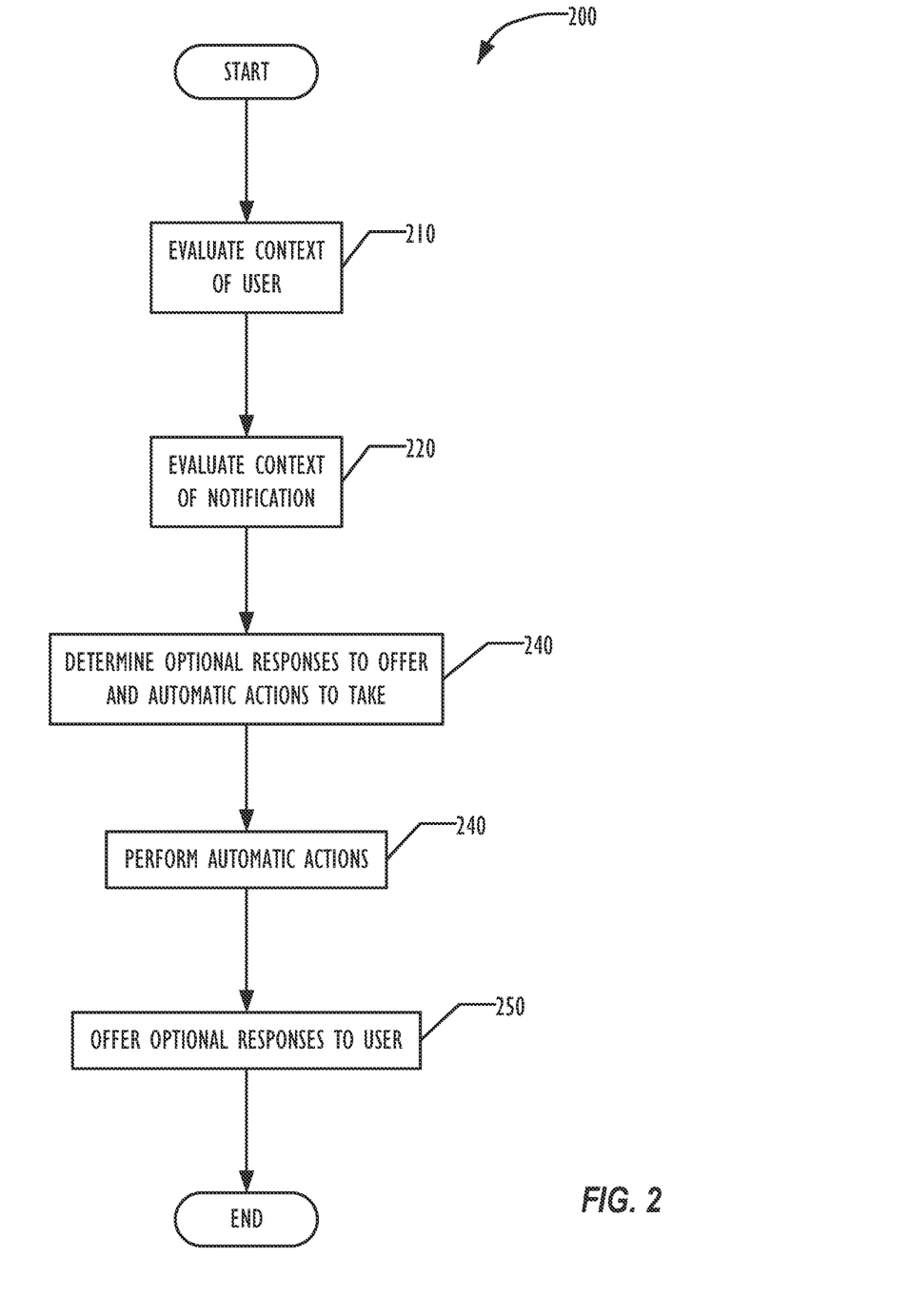
FIG. 2 is a flowchart that illustrates a technique for determining what optional response should be offered to a user.

FIG. 2 is a flowchart illustrating a technique 200 for determining which optional responses to offer to a user. This technique may be performed prior to displaying the notification to the user, or may be performed after the user has selected the Other option. In block 210, a context of the user may be obtained and evaluated. This context evaluation may include one or more contextual data associated with the user, including determining the current location of the user, a current route being taken by the user, and a mode of transport being used by the user. Other contextual data that may be evaluated may include information related to other events associated with the user, such as other events scheduled on the user's calendar. For example, the user may have back-to-back events scheduled on the calendar, and that context may be useful for generating the optional responses. These contextual data are illustrative and by way of example only, and any information associated with the user may be evaluated as contextual data for this purpose.

In block 220, a context of the notification may be obtained and evaluated. As with the user context, the context of the notification may include one or more contextual data associated with the notification, including determining the location of the event corresponding to the notification, the identification of other people associated with the event, the current time, and the time of the event. The evaluation of the notification context may also include evaluating other types of information, such as determining a type of the event corresponding to the notification. As with the user context, these contextual data are illustrative and by way of example only, and any information associated with the user may be considered as contextual data for this purpose.

The context of the user and the context of the notification are determined and evaluated at the time of the notification. Thus these contexts may change over time. For example, the determination of the context of the user may discover that the user is in an automobile, based on a Bluetooth pairing in effect at the time of the notification. By using that example context of the user, the optional responses offered to the user may be tailored to those that are appropriate for a person in a car, such as hiding or deprecating optional responses that would require text entry or other activities that are inappropriate for a driver while driving.

In block 240, the optional responses to offer are determined based, at least in part, on the user context and the context of the notification. Typically, the intersection of the user context and the notification context provides information for selecting or generating the optional responses.

In addition to the optional responses, some implementations may allow the determination of automatic actions to be taken in response to the notification. These automatic actions are typically performed in the background in block 240 upon the display of the notification. For example, the automatic actions may trigger additional notifications. In another example, an automatic action may be a request to an agent such as the Apple Inc. SIRI® intelligent personal assistant application to perform actions, such as pre-loading information that the user might need based on the user context and/or the notification context. (SIRI is a registered trademark of Apple Inc.)

Once the optional responses have been generated, then in block 250 the optional responses may be offered to the user upon the user selecting the Other option (however designated in the user interface). In some implementations, one of the optional responses may be indicated as a default optional response.

Many kinds of optional responses and corresponding actions may be generated based at least in part on the user context and the notification context. One response may cause transmitting a message to other attendees of an event that the user will be late or requesting another person to take an action. Another response might be to generate another notification that reminds the user when the user should leave to attend the event. Another response may be to transmit a request to an agent to search for information about parking near the location of the event. Yet another response may be to transmit a request to a user of another programmable device to taken an action. By using contextual information, different responses may be offered depending on how far in the future the event associated with the notification is. For example, if the user's location is known to be too far away from the location of the event for the user to arrive on time, one of the optional responses may be to send a message to the event organizer that the user will arrive late. Alternatively, if the user's location is known to be nearby, one of the optional responses may be to request information about parking near the event location.

The optional responses that may be generated based at least in part on the user context and the notification context may be determined using any of the context information that may be relevant, including time-based information (e.g., the start of a meeting) or location-based information (e.g., the location of the user or the location of the event).

The techniques described above may also be used to expand the range of possibilities related to options such as the Snooze option. For example, instead of offering a fixed list of possible Snooze actions, by examining the context of the user and the context of the notification, a contextual offer of Snooze options may be provided. For example, in addition to requesting a re-notification in a certain period of time or a certain period of time prior to the event time, contextual information may allow offering the user the option to request a re-notification when the user arrives (or leaves) a location, such as "Remind me when I get to work" or "Remind me when I leave to go home."

The techniques described above may be implemented in numerous ways, one of which may be to use an agent, such as the SIRI intelligent personal assistant provided by Apple Inc. to process the user and notification context intersection to generate the optional responses to display to the user, similar to the way in which the agent may provide a choice of multiple phone numbers to use for calling someone.

The optional responses generated by the technique 200 of FIG. 2 may create a hierarchy, such as a tree, of optional responses that may be offered to the user. Implementations may use user context information to prune or organize the hierarchy of possible optional responses to offer so that only responses the user is likely to want to see may be offered or so that the most likely responses are positioned for ease of selection. For example, an implementation may generate or select one or more optional responses for offering to the user, and one or more of those responses may be selected for offering to the user based an evaluation of the history of responses previously selected by the user. Some implementations may determine the type of the notification and evaluate the user's history or responses previously selected by the user for notifications of that type.

The optional responses may call for a communication to be sent on behalf of the user to someone, such as an event organizer or someone that the user is supposed to meet at the event. These communications, although described above as messages, are not limited to one type of transport, but may use any type of transport mechanism, including telephone calls, short messaging service (SMS) messaging, video calls, email, etc. For example a user may be offered an opportunity to use a video call capability on a mobile device, such as the FACETIME® software provided by Apple Inc., to make a video call into a meeting event if the organizer or another attendee also has video call capability.

Any desired user interface may be provided for displaying the optional notification responses. In some implementations, the notification may be displayed using conventional notification display services provided by the operating system or the application generating the notification. Upon selecting the Other response to the notification, the optional responses may be displayed as added elements to the notification display or in a separate display element as desired. Selection of the optional responses may be performed using any available affordance processing technique, including touch, pointer selection, or voice commands.

Implementation in an Electronic Device

Figure 3:
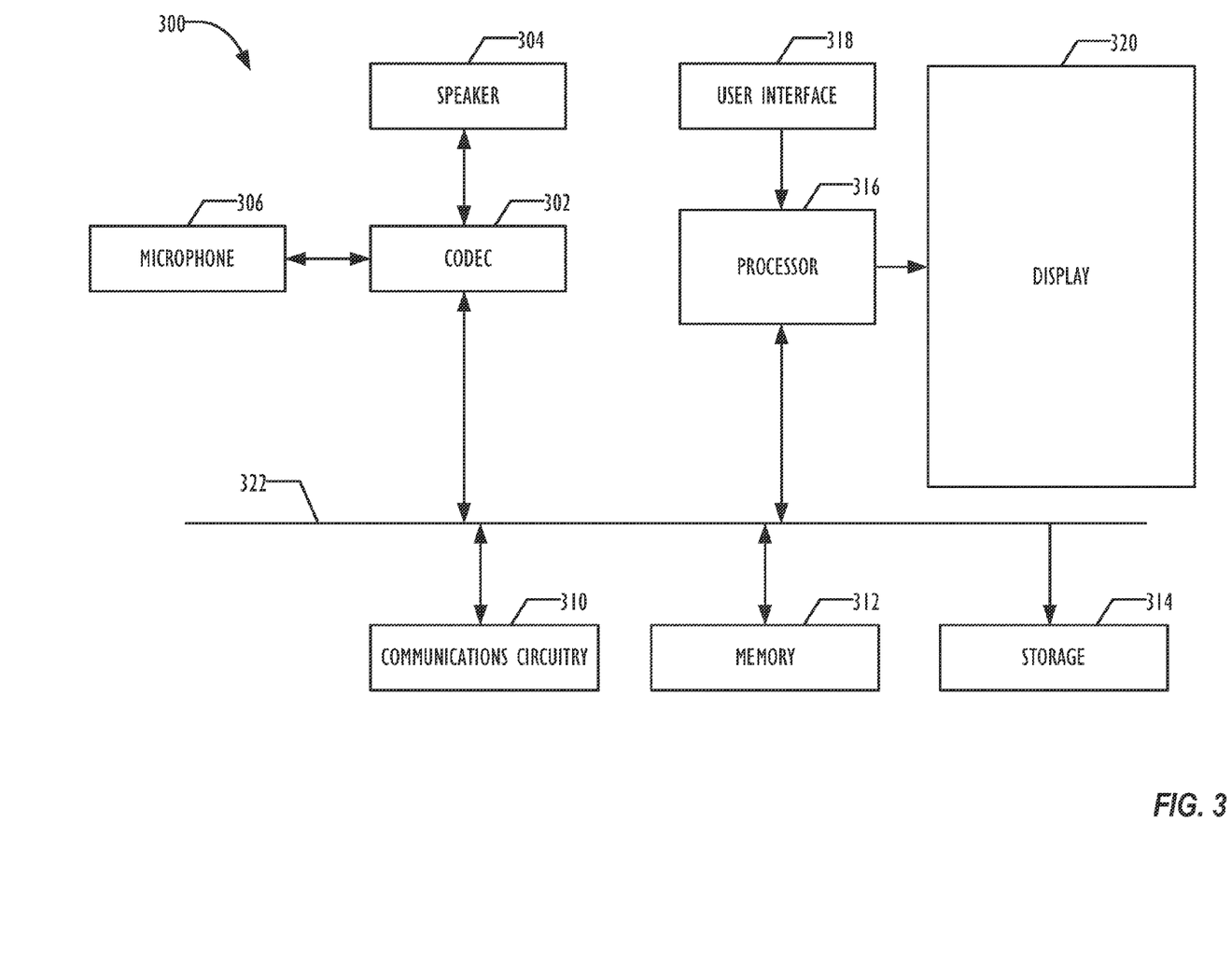
FIG. 3 is a block diagram illustrating a programmable device for implementing the techniques of FIGS. 1 and 2.

FIG. 3 is a simplified functional block diagram illustrating an electronic device 300 according to one embodiment that can implement the techniques described above. The electronic device 300 may include a processor 316, display 320, microphone 306, audio/video codecs 302, speaker 304, communications circuitry 310, user interface 318, memory 312, storage device 314, and communications bus 322. Processor 316 may be any suitable programmable control device and may control the operation of many functions, such as the generation and/or processing of events and notifications, as well as other functions performed by electronic device 300. Processor 316 may drive display 320 and may receive user inputs from the user interface 318. An embedded processor provides a versatile and robust programmable control device that may be utilized for carrying out the disclosed techniques.

Storage device 314 may store media (e.g., image and video files), software (e.g., for implementing various functions on device 300), preference information, device profile information, and any other suitable data. Storage device 314 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++).

Memory 312 may include one or more different types of memory which may be used for performing device functions. For example, memory 312 may include cache, ROM, and/or RAM. Communications bus 322 may provide a data transfer path for transferring data to, from, or between at least storage device 314, memory 312, and processor 316. Although referred to as a bus, communications bus 322 is not limited to any specific data transfer technology. User interface 318 may allow a user to interact with the electronic device 300. For example, the user interface 318 can take a variety of forms, such as a button, keypad, dial, a click wheel, or a touch screen.

The electronic device 300 may be a device such as such a mobile phone, personal data assistant (PDA), portable music player, monitor, television, laptop, desktop, and tablet computer, or other suitable personal device.

Figure 4:
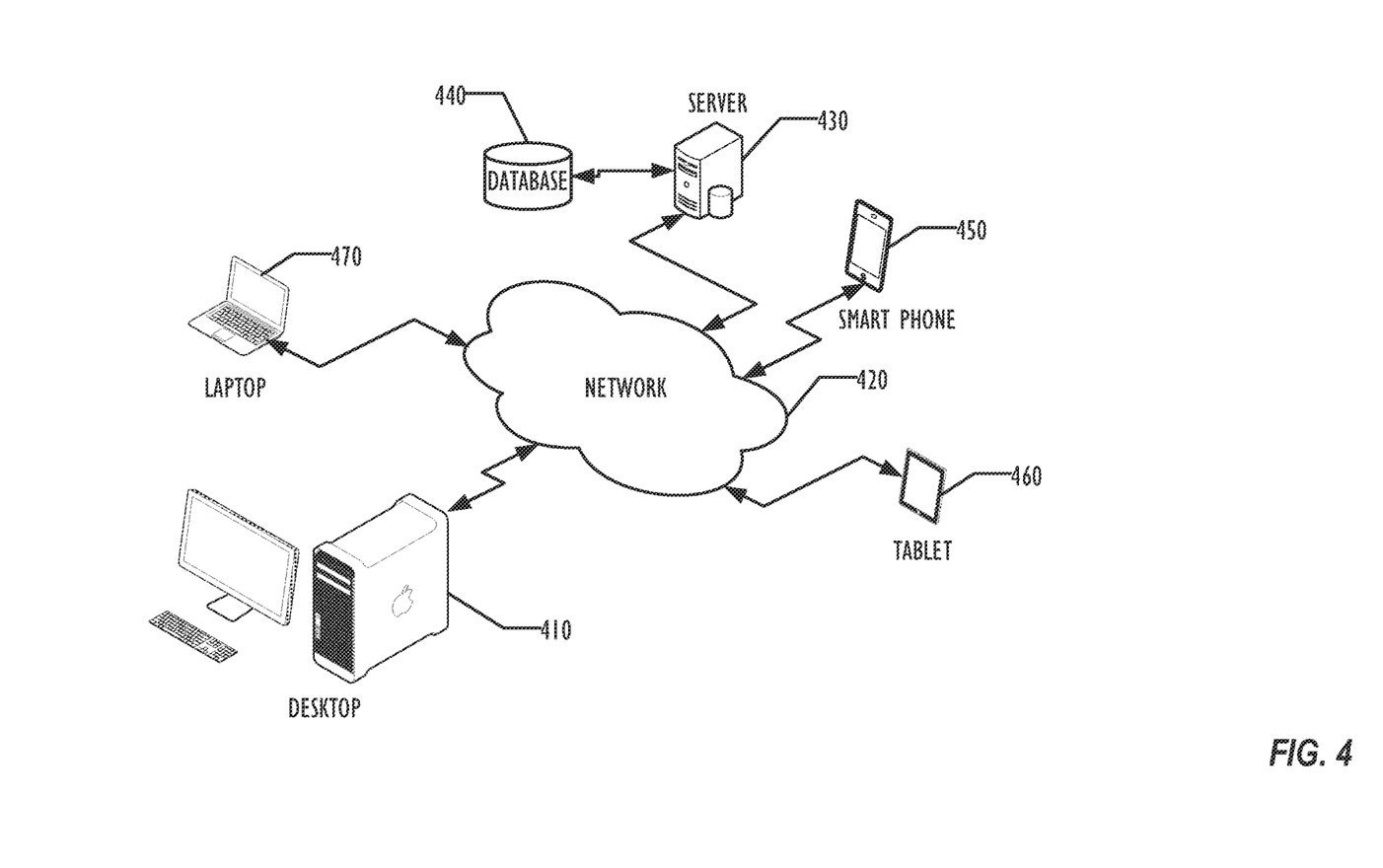
FIG. 4 is a block diagram illustrating a network connecting programmable devices that implement the techniques of FIGS. 1 and 2.

FIG. 4 is a block diagram illustrating a network 420 connecting several user devices, each of which generally includes the elements of the programmable device 600, including a desktop computer 410, a smart phone 450, a tablet computer 460, and a laptop 470 that implement the techniques described above. A user of each of the devices may receive notifications and be offered contextually relevant optional responses as described above. The server 430 and database 440 may be accessed by an intelligent personal assistant agent running on one of the user devices to provide information for the optional responses. Although a network 420 is illustrated in FIG. 4 as communicatively connecting all of the various devices, any of the user devices may be operated without a network connection to perform the techniques described above as desired. In addition, although only a single network 420 is illustrated, the devices may be connected via multiple interconnected networks, including local area networks, wide area networks, and the Internet, and may use wired or wireless connections to those networks.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. At least one non-transitory program storage device, readable by at least one programmable control device, comprising instructions stored thereon for causing the at least one programmable control device to:
    receive an event notification from an electronic schedule service of an operating system of a programmable device;
    evaluate a first context, the first context including a context of the event notification;
    evaluate a second context, the second context including a context of the programmable device at a time the event notification is received, wherein the instructions for causing the at least one programmable control device to evaluate the second context comprise instructions for causing the at least one programmable control device to:
        determine a type of the event notification; and determine a history of responses selected in response to previous notifications with the determined type of the event notification;

generate, at the time the event notification is received, one or more optional responses based on the evaluation of the first context and the evaluation of the second context;

cause display of at least one of the one or more optional responses; and automatically transmit, in response to causing display of the event notification along with the one or more optional responses, a request to an agent to preload information corresponding to the event notification based on the first context and the second context.

2. The at least one program storage device of claim 1, wherein the one or more optional responses includes a default optional response to the event notification.

3. The at least one program storage device of claim 1, wherein the instructions for causing the at least one programmable control device to generate the one or more optional responses comprise instructions for causing the at least one programmable control device to:

configure a first optional response of the one or more optional responses to generate a second event notification by the electronic schedule service.

4. The at least one program storage device of claim 1, wherein the instructions for causing the at least one programmable control device to generate the one or more optional responses comprise instructions for causing the at least one programmable control device to:

generate the one or more optional responses prior to displaying the event notification.

5. The at least one program storage device of claim 1, wherein the instructions stored thereon further comprise instructions for causing the at least one programmable control device to:

automatically trigger, in response to causing the display of the event notification along with the one or more optional responses, additional event notifications based on the evaluation of the first context and the second context.

6. The at least one program storage device of claim 5, wherein the one or more optional responses include a contextual offer of a snooze option to request for a re-notification of the event notification.

7. The at least one program storage device of claim 1, wherein the instructions stored thereon further comprise instructions that cause the at least one programmable control device to transmit a message to another programmable device, wherein the message comprises a request to perform an action based on the evaluation of the first context and the second context.

8. The at least one program storage device of claim 1, wherein the instructions stored thereon further cause the at least one programmable control device to:

remove the one or more optional responses if no selection is made within a predetermined time.

9. The at least one program storage device of claim 1, wherein the instructions to generate one or more optional responses comprise instructions that cause the at least one programmable control device to:

create a hierarchy for a plurality of possible optional responses, the hierarchy arranges the possible optional responses according to a likelihood of a user's interest in the possible optional responses; and generate, at the time the event notification is received, the one or more optional responses from the possible optional responses by pruning the hierarchy based on the history of the responses selected in response to previous notifications of the determined type of the event notification.

10. The at least one program storage device of claim 9, wherein a number of the one or more optional responses is less than a number of possible optional responses after pruning the hierarchy.

11. At least one non-transitory program storage device, readable by at least one programmable control device, comprising instructions stored thereon for causing the at least one programmable control device to:

receive an event notification from an electronic schedule service of an operating system of a programmable device;

evaluate a first context, the first context including a context of the event notification;

evaluate a second context, the second context including a context of the programmable device at a time the event notification is received, wherein the instructions for causing the at least one programmable control device to evaluate the second context comprise instructions for causing the at least one programmable control device to:

determine a type of the event notification; and determine a history of responses selected in response to previous notifications with the determined type of the event notification;

generate, at the time the event notification is received, a plurality of optional responses to the event notification based on the evaluation of the first context and the evaluation of the second context;

cause display of a first optional response from the plurality of optional responses to the event notification;

cause display of a second optional response from the plurality of optional responses to the event notification, wherein the second optional response is selected based on an evaluation of the determined history of responses selected; and automatically trigger, in response to causing display of the event notification along with the first optional response, additional event notifications based on the evaluation of the first context and the second context.

12. The at least one program storage device of claim 11, wherein the instructions for causing the at least one programmable control device to cause display of the first optional response from the plurality of optional responses to the event notification further comprise instructions for causing the at least one programmable control device to:

transmit a request to another programmable device to perform an action.

13. The at least one program storage device of claim 11, wherein the instructions to generate a plurality of optional responses comprise instructions that cause the at least one programmable control device to:

create a hierarchy for a plurality of possible optional responses, the hierarchy arranges the possible optional responses according to a likelihood of the user's interest in the possible optional responses; and generate the optional responses from the possible optional responses by pruning the hierarchy based on the history of the responses selected in response to previous notifications of the determined type of the event notification.

14. The at least one program storage device of claim 13, wherein a number of the optional responses is less than a number of possible optional responses after pruning the hierarchy.

15. The at least one program storage device of claim 11, wherein the instructions stored thereon further comprise instructions for causing the at least one programmable control device to:
   automatically transmit, in response to causing display of the event notification along with the first optional response, a request to an agent to preload information corresponding to the event notification based on the first context and the second context.

16. A programmable device, comprising:
   at least one programmable control device;
   a memory, coupled to the at least one programmable control device;
   an operating system stored in the memory, comprising:
      logic to generate an event notification from an electronic scheduler to a user of the programmable device;
      logic to evaluate a context of the event notification;
      logic to evaluate a context of the user at a time the event notification is generated,
      wherein the logic to evaluate the context of the user at the time the event notification is generated comprises:
         logic to determine a type of the event notification; and
         logic to determine a history of responses selected by the user of the programmable device to previous notifications with the determined type of the event notification;
      logic to generate one or more optional responses to the event notification is based on the evaluation of the context of the event notification and the evaluation of the context of the user at the time the event notification is generated;
      logic to cause display of at least one of the one or more optional responses; and
      logic to automatically trigger, in response to causing display of the event notification along with the one or more optional responses, additional event notifications based on the evaluation of the context of the event notification and the context of the user.

17. The programmable device of claim 16, wherein the one or more optional responses includes a default optional response to the event notification.

18. The programmable device of claim 16, further comprising:
   logic to perform an action associated with a first optional response selected from the one or more optional responses.

19. The programmable device of claim 18, wherein the action comprises:
   transmitting a request to another programmable device to perform an action.

20. The programmable device of claim 18, wherein the action comprises:
   transmitting a message to another programmable device.

21. The programmable device of claim 16, further comprising:
   logic to automatically transmit, in response to causing display of the event notification along with the one or more optional responses, a request to an agent to preload information corresponding to the event notification based on the context of the event notification and the context of the user.

22. The programmable device of claim 16, wherein the logic to generate one or more optional responses comprises:
   logic to create a hierarchy for a plurality of possible optional responses, the hierarchy arranges the possible optional responses according to a likelihood of a user's interest in the possible optional responses; and
   logic to generate the one or more optional responses from the possible optional responses by pruning the hierarchy based on the history of the responses selected in response to previous notifications of the determined type of the event notification.

23. The programmable device of claim 22, wherein a number of the one or more optional responses is less than a number of possible optional responses after pruning the hierarchy.

24. A method comprising:
   generating, by a notification service of an operating system of a programmable device, a notification of an event from an electronic scheduler;
   comparing a context of the notification with a context of the programmable device at a time the notification is generated, wherein the comparison includes evaluating the context of the notification and evaluating the context of the programmable device at the time the notification is generated, and wherein the evaluation of the context of the programmable device at the time the notification is generated includes:
      determining a type of the notification; and
      determining a history of responses received by the programmable device to previous notifications with the same determined type of the notification;
   generating one or more optional responses to the notification, wherein the one or more optional responses are determined in response to the comparison of the context of the notification with the context of the programmable device at the time the notification is generated; and
   automatically transmitting, in response to causing display of the notification along with the one or more optional responses, a request to an agent to preload information corresponding to the notification based on the context of the event notification and the context of the programmable device.

25. The method of claim 24, further comprising performing an action corresponding to the one or more optional responses, wherein performing the action corresponding to the one or more optional responses comprises transmitting a message to another programmable device.

26. The method of claim 24, further comprising automatically triggering, in response to causing display of the notification along with the one or more optional responses, additional event notifications based on the evaluation of the context of the event notification and the context of the programmable device.

27. The method of claim 24, wherein generating one or more optional responses comprises:
   creating a hierarchy for a plurality of possible optional responses, the hierarchy arranges the possible optional responses according a likelihood of a user's interest in the possible optional responses; and
   generating the one or more optional responses from the possible optional responses by pruning the hierarchy based on the history of the responses selected in response to notifications of the determined type of the notification.

28. The method of claim 27, wherein a number of the one or more optional responses is less than a number of possible optional responses after pruning the hierarchy.

\* \* \* \* \*